W. W. TEMPLET.
VALVE OPERATING MECHANISM FOR FLUSH TANKS.
APPLICATION FILED MAR. 5, 1919.

1,429,798.

Patented Sept. 19, 1922.
2 SHEETS—SHEET 1.

Inventor
William W. Templet
By Arthur L. Slee
Atty

W. W. TEMPLET.
VALVE OPERATING MECHANISM FOR FLUSH TANKS.
APPLICATION FILED MAR. 5, 1919.

1,429,798. Patented Sept. 19, 1922.
2 SHEETS—SHEET 2.

Inventor
William W. Templet
By Arthur L. Slee
Atty.

Patented Sept. 19, 1922.

1,429,798

UNITED STATES PATENT OFFICE.

WILLIAM W. TEMPLET, OF OAKLAND, CALIFORNIA.

VALVE-OPERATING MECHANISM FOR FLUSH TANKS.

Application filed March 5, 1919. Serial No. 280,874.

*To all whom it may concern:*

Be it known that I, WILLIAM W. TEMPLET, a citizen of the United States, residing in the city of Oakland, county of Alameda, and State of California, have invented a new and useful Improvement in a Valve-Operating Mechanism for Flush Tanks, of which the following is a specification.

In flush tanks of the low-down type the lever that operates the flush valve has hitherto been directly connected with the handle on the outside of the tank, so that the valve can be operated by movement of the handle in one direction only. Many persons who do not know, or who in their hurry forget in what direction the handle should properly be turned in order to operate the valve, are liable to use force in an attempt to turn the handle in the wrong direction, thereby often permanently injuring the flush valve or the operating mechanism therefor so as to cause a constant leakage of water from the tank through the valve.

When thus repair of the flush valve mechanism is required, a further difficulty arises by the inconvenient arrangement for the dissembling of the parts that operate the flush valve, so that considerable time is lost in making the necessary repair, thus entailing such great cost of the repair that many persons prefer to be annoyed by the leakage flush valve and to have the consequent expense of the water wasted as a result thereof than to pay the cost of such repairs.

One object of this invention is to provide for flush tanks a handle which is normally held independent of the valve and in a pendent position by gravity, so that the flush valve may be easily operated by oscillation of the handle in either direction without danger of injury of the flush valve or to the valve-operating mechanism.

A further object is to provide means to restrict the oscillative movement of the handle and thereby to prevent the valve-operating mechanism from getting out of order.

A still further object is to make provision for easily assembling and dissembling the parts in the device so as to minimize the cost of necessary repairs of the flush valve and the valve-operating mechanism.

I accomplish these and other objects by means of the device disclosed in the drawings, which form a part of the present specification and wherein like characters are used to designate similar parts throughout the specification and drawings, and in which:—

Figure 1:
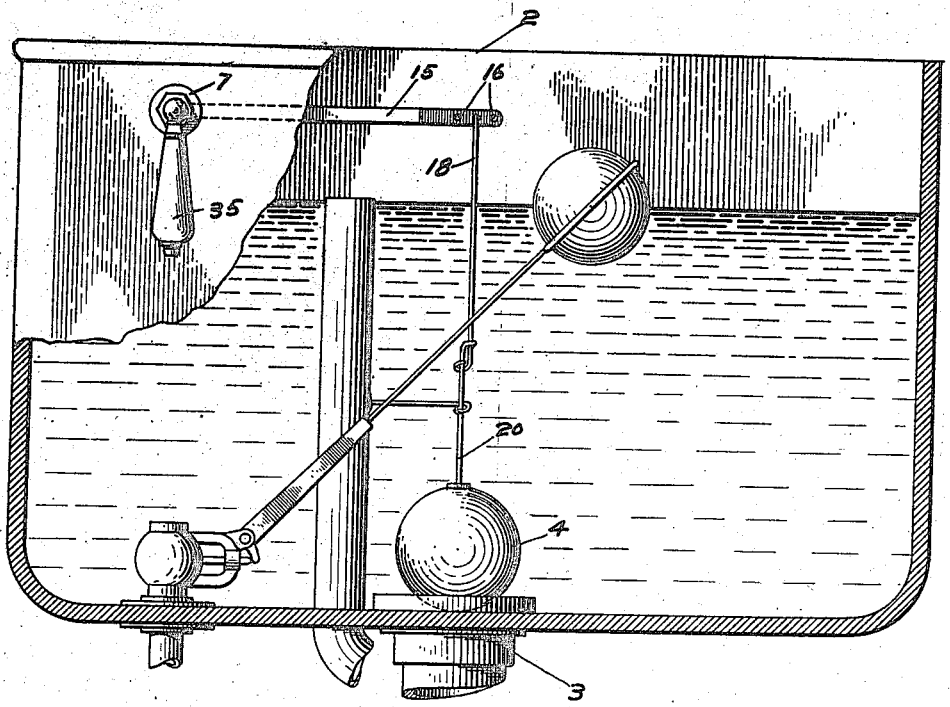
Fig. 1 is a front elevation of my device, the view being partly in section and broken away in order to show the connection of the flush valve with the operating mechanism therefor.
Figure 2:
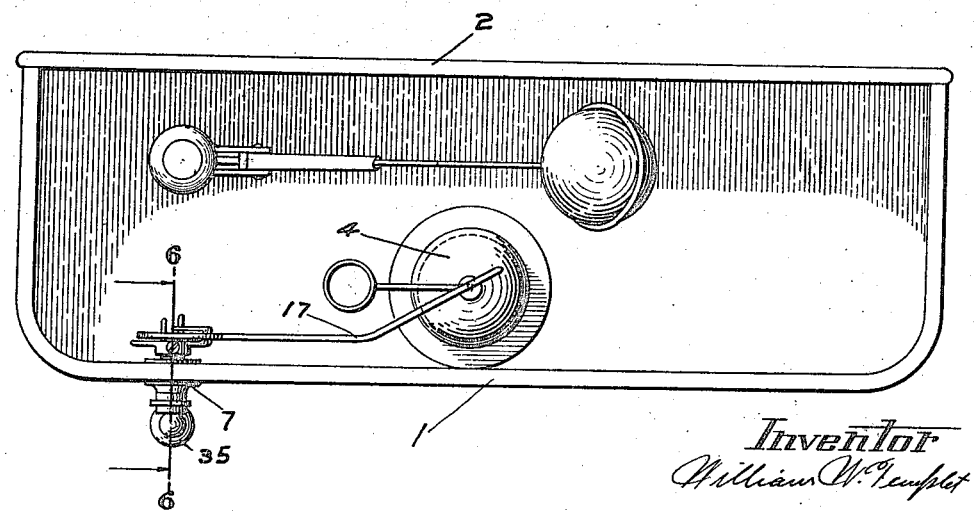
Fig. 2 is a horizontal plan view of a flush tank with my device attached thereto.
Figure 4:
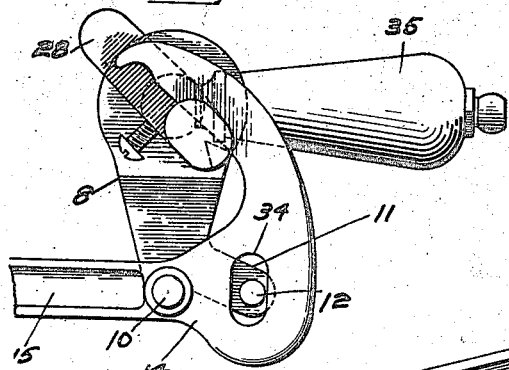
Figure 3:
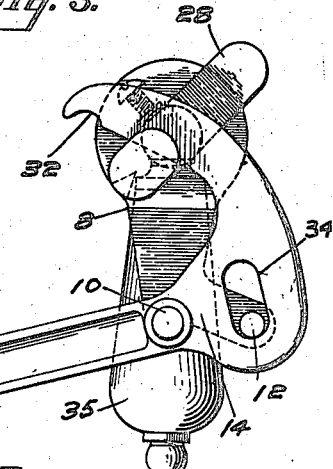
Figure 5:
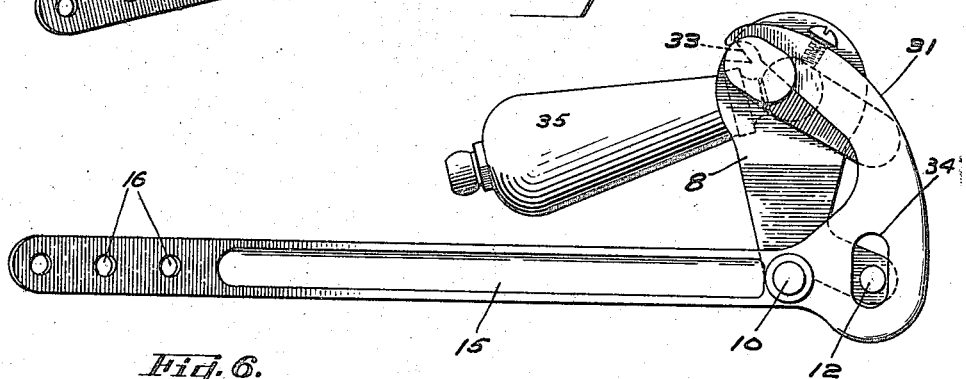
Figure 6:
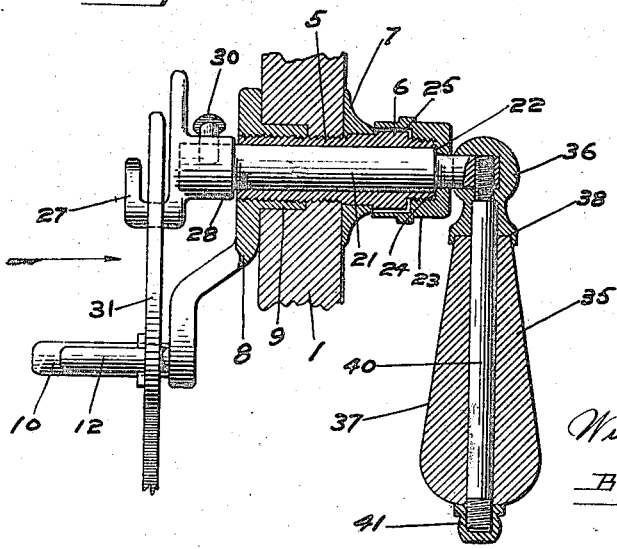

Figs. 3, 4 and 5 are views taken in the direction of the feathered arrow in Fig. 6, Fig. 3 showing the valve-operating lever in inoperative position, Fig. 4 showing the lever, part of which is broken away, in a valve-operative position, and the handle oscillated toward the right, and Fig. 5 also showing the lever in a valve-operating position, but the handle oscillated toward the left; and Fig. 6 is a view partly sectional, taken on line 6—6 in Fig. 2, the wall of the flush tank and the lever of the valve-operating mechanism being broken away in order to contract the view.

In the front wall 1 of the flush tank 2, having the usual outlet 3 at the bottom thereof, and also the usual ball valve 4 for closing the outlet, I provide a sleeve 5, which is externally threaded at both ends and extends into the tank 2 and outside thereof. The sleeve 5 has thereon a shoulder 6, adjacent to the threaded outer end of the sleeve and preferably angular in shape, and upon the sleeve, between the shoulder 6 and the wall 1, is a washer 7, the inner end of the sleeve being screwed into one end of a bracket 8 and said end of the bracket having a boss 9 extending toward the wall and being preferably provided with flat side faces, so that, when the sleeve is screwed into the bracket, the boss 9 is forced into the wall 1 and the sleeve and the bracket are thus securely held in the wall and prevented from turning. At the other end of the bracket 8 is a pin or lug 10 and in a lateral extension 11 of said end of the bracket is another pin or lug 12, both pins or lugs 10 and 12 extending inwardly into the tank 2, and the bracket being so placed upon the sleeve 5 that the pins 10 and 12 are in a position below the sleeve and one of them in or near and parallel with the perpendicular plane drawn through the axis of the sleeve.

Rotatably mounted upon the pin 10 is a bell crank lever 14, the long arm 15 of which extends toward the middle of the tank 2 and has near its end holes 16 and a suitable bend 17, so that one of the holes 16 is adapted to receive therein the upper end of the operating wire 18 and to hold the wire virtually in perpendicular position directly above the center of the outlet 3, said wire 18 and the wire 20, connected with the ball valve 4, engaging each other in the usual manner for the operation of the valve.

Within the sleeve 5 is rotatably mounted a shaft 21, the outer end of which is preferably reduced, thus forming a shoulder 22 on the shaft, and a nut 23, having at its outer end a central aperture adapted to fit over the reduced end of the shaft and a female thread fitting the outer threaded end of the sleeve 5 so that an internal annular shoulder 24 is formed at the outer end of the nut, is screwed upon the sleeve, the nut also having an inner, enlarged central bore 25, whereby the nut is adapted to turn freely over the shoulder 6 on the sleeve.

A yoke 27, having a wing or counter-balance 28 oppositely disposed thereto and an inwardly extending boss 29 provided with a bore that fits the shaft 21, is secured to the inner end of shaft by a screw 30, which is threaded through the boss and extends into the shaft so as to prevent the yoke from turning upon the shaft. This yoke 27 is adapted to embrace the short arm 31 of the lever 14, and the short arm 31 being curved and extending upwardly and above the shaft 21 and also adjacent to its end having a recess 32 in its inner edge for engaging a detent 33 in the yoke, at the bent part thereof. Adjacent to the pin 10 the short arm 31 of the lever 14 is widened and this wide end is provided with a slot 34 through which the pin 12 in the bracket 8 extends, the slot being sufficiently wide to allow free play of the pin 12 therein when the lever is swung upon its pivot 10.

On the reduced outer end of the shaft 21 is mounted a handle 35, which may be of any suitable construction, but is preferably constructed as shown in the drawings for the convenience in assembling and dissembling the device. This handle, as shown, comprises two parts, the inner part 36 of which has a bore therein, transverse to the axis of the handle and fitting the reduced part of the shaft 21, and another bore, coaxial with a longitudinal, central bore in the outer part 37 of the handle, the outer end of the bore in the inner part 36 being enlarged, as shown at 38, and the inner part thus serving as a ferrule for the outer part of the handle. Although the handle shown comprises two main parts, the outer one of which for ornamental purposes may be of a different material than the inner part, it is understood that the handle proper may be made in one part. A stud 40 is with its inner end screwed into the reduced part of the shaft 21, and upon the outer end of the stud is screwed a nut 41 for firmly securing the handle 35 to the shaft. It should be noticed that, when the handle is so secured, the inner part 36 thereof prevents inward longitudinal movement of the shaft 21 in the sleeve 5, while the shoulder 22 prevents outward longitudinal movement thereof, the inner part 36 being sufficiently near the outer end of the nut 23 to allow only a slight play of the shaft in the sleeve 5, so that the handle is adapted by its own gravity to be held normally in a pendent position.

When the handle thus is held in a pendent or inoperative position, the detent 33 of the yoke 27 is out of engagement with the inner edge of the short arm 31 of the lever 14, so that the weight of the long arm 15 of the lever in conjunction with the weight of the operative wire 18 holds the lever arm 15 in its lowest position, which position is determined by the engagement of the pin 12 with the lower end of the slot 34, as shown in Fig. 3. Again, when the handle is moved to the position shown in Fig. 4, an excessively long movement in that direction will be prevented by the engagement of the pin 12 with the upper end of the slot 34, while a movement of the handle in the direction shown in Fig. 5 will be restricted by the engagement of the detent 33 of the yoke 27 with the recess 32 in the short arm 31, so that a movement of the handle toward either of the directions shown in Figs. 4 and 5 will cause the lever 14 to lift the ball valve 4 from its seat in the outlet 3 of the flush tank 2. From the foregoing it is thus seen that the handle may be oscillated in either direction without injury to the valve-operating mechanism of the device.

What I claim as new and desire to secure by Letters Patent, is:—

In a flush tank operating mechanism, a shaft rotatably mounted in the wall of the tank and extending therethrough; a handle secured to the shaft at the outer end thereof so that the handle is thereby adapted to oscillate and to remain normally in a pendent position; a bell crank lever having a curved short arm and being pivotally mounted in the tank and having its long arm connected with the flush valve in the tank for opening the flush valve, the short arm having a slot therein and inner edge of the short arm having a recess therein adjacent to the end of the arm; a yoke secured to the shaft at the inner end thereof and embracing the short arm of the lever, said yoke engaging the inner edge of the short arm for operating the lever by oscillation of the handle; a detent in the yoke adapted to engage the recess in the short arm for restricting the oscillative movement of the handle in one direction; and a pin connected with the wall of the tank and extending through the slot for restricting the oscillative movement of the handle in the other direction.

In witness whereof I hereunto set my signature.

WILLIAM W. TEMPLET.